US009623575B2

(12) United States Patent
Griffin et al.

(10) Patent No.: US 9,623,575 B2
(45) Date of Patent: Apr. 18, 2017

(54) SHAVING SYSTEMS

(71) Applicant: SHAVELOGIC, INC., Dallas, TX (US)

(72) Inventors: John W. Griffin, Moultonboro, NH (US); Craig A. Provost, Providence, RI (US); William E. Tucker, Attleboro, MA (US); Douglas R. Kohring, Saco, ME (US)

(73) Assignee: SHAVELOGIC, INC., Dallas, TX (US)

( * ) Notice: Subject to any disclaimer, the term of this patent is extended or adjusted under 35 U.S.C. 154(b) by 292 days.

(21) Appl. No.: 13/802,614

(22) Filed: Mar. 13, 2013

(65) Prior Publication Data

US 2014/0165800 A1 Jun. 19, 2014

Related U.S. Application Data

(60) Provisional application No. 61/738,857, filed on Dec. 18, 2012.

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01); *Y10T 83/04* (2015.04)

(58) Field of Classification Search
CPC ...... B26B 21/521; B26B 21/225; Y10T 83/04
USPC ................................ 30/526, 527, 32, 50, 57
See application file for complete search history.

(56) References Cited

U.S. PATENT DOCUMENTS

| | | | |
|---|---|---|---|
| 996,879 | A | 7/1911 | Odell |
| 1,015,575 | A | 1/1912 | Meyer |
| 1,074,615 | A | 10/1913 | Folmer |
| 3,593,416 | A | 7/1971 | Edson |
| 3,709,517 | A | 1/1973 | Wossner |
| 3,768,348 | A | 10/1973 | Braun et al. |
| 3,938,247 | A | 2/1976 | Carbonell et al. |
| 4,094,063 | A | 6/1978 | Trotta |
| 4,475,286 | A | 10/1984 | Saito |
| 4,850,518 | A | 7/1989 | Salmon et al. |
| 4,970,784 | A | 11/1990 | Althaus et al. |

(Continued)

FOREIGN PATENT DOCUMENTS

| | | |
|---|---|---|
| EP | 1245351 | 10/2002 |
| EP | 1488894 | 12/2004 |

(Continued)

OTHER PUBLICATIONS

Search Report—Corresponding European Patent Application No. 13840539, dated Apr. 25, 2016, 7 pages.

(Continued)

*Primary Examiner* — Omar Flores Sanchez
(74) *Attorney, Agent, or Firm* — Leber IP Law

(57) ABSTRACT

Replaceable shaving assemblies are disclosed that include a blade unit, an interface element configured to removeably connect the blade unit to a handle, on which the blade unit is pivotably mounted, and an return element disposed between the blade unit and interface element. The return element serves as interface piece, connector and pivot all in one. Shaving systems including such shaving assemblies are also disclosed, as are methods of using such shaving systems.

20 Claims, 18 Drawing Sheets

(56) References Cited

U.S. PATENT DOCUMENTS

| | | | | |
|---|---|---|---|---|
| 5,074,042 | A | 12/1991 | Althaus et al. | |
| 5,168,628 | A | 12/1992 | Mock et al. | |
| 5,219,468 | A | 6/1993 | Olson | |
| 5,369,885 | A | 12/1994 | Ferraro | |
| 5,402,574 | A | 4/1995 | Milner | |
| 5,466,901 | A | 11/1995 | Mochizuki | |
| 5,533,263 | A | 7/1996 | Gilder | |
| 5,551,153 | A | 9/1996 | Simms | |
| 5,551,717 | A | 9/1996 | De Courcey Milne | |
| 5,560,106 | A | 10/1996 | Armbruster | |
| 5,645,603 | A | 7/1997 | Peters | |
| 5,661,907 | A | 9/1997 | Apprille, Jr. | |
| 5,669,139 | A | 9/1997 | Oldroyd et al. | |
| 5,678,316 | A | 10/1997 | Althaus et al. | |
| 5,771,591 | A | 6/1998 | Armbruster | |
| 5,794,342 | A | 8/1998 | Davey | |
| 5,813,293 | A | 9/1998 | Apprille, Jr. | |
| 5,855,071 | A * | 1/1999 | Apprille et al. | 30/532 |
| 5,890,296 | A | 4/1999 | Metcalf et al. | |
| 6,014,918 | A | 1/2000 | Orloff | |
| 6,112,412 | A | 9/2000 | Richard | |
| 6,122,826 | A * | 9/2000 | Coffin | B26B 21/225 30/527 |
| 6,138,361 | A * | 10/2000 | Richard et al. | 30/50 |
| 6,145,201 | A | 11/2000 | Andrews | |
| 6,161,287 | A | 12/2000 | Swanson et al. | |
| 6,182,366 | B1 | 2/2001 | Richard | |
| 6,216,345 | B1 | 4/2001 | Andrews | |
| 6,223,442 | B1 * | 5/2001 | Pina | 30/527 |
| 6,311,400 | B1 * | 11/2001 | Hawes et al. | 30/527 |
| 6,357,118 | B1 | 3/2002 | Eichhorn et al. | |
| 6,502,318 | B1 | 1/2003 | Gilder | |
| 6,557,265 | B2 | 5/2003 | Coffin | |
| 6,560,881 | B2 | 5/2003 | Coffin | |
| 6,612,040 | B2 | 9/2003 | Gilder | |
| 6,772,523 | B1 | 8/2004 | Richard | |
| 6,807,739 | B2 | 10/2004 | Follo | |
| 6,854,188 | B1 | 2/2005 | Wonderley | |
| 6,880,253 | B1 | 4/2005 | Gyllerstrom | |
| 6,973,730 | B2 | 12/2005 | Tomassetti | |
| 7,028,405 | B2 | 4/2006 | Paas et al. | |
| 7,086,160 | B2 | 8/2006 | Coffin | |
| 7,100,284 | B2 * | 9/2006 | King | 30/49 |
| 7,103,976 | B2 | 9/2006 | Pennella | |
| 7,152,512 | B1 | 12/2006 | Prochaska | |
| 7,200,942 | B2 * | 4/2007 | Richard | 30/526 |
| 7,461,458 | B2 * | 12/2008 | Peyser et al. | 30/532 |
| 7,526,869 | B2 * | 5/2009 | Blatter et al. | 30/532 |
| 7,574,809 | B2 * | 8/2009 | Follo et al. | 30/527 |
| 7,669,511 | B2 | 3/2010 | King | |
| 7,797,834 | B2 | 9/2010 | Steunenberg | |
| 7,802,368 | B2 * | 9/2010 | Coffin et al. | 30/531 |
| 7,877,879 | B2 | 2/2011 | Nakasuka | |
| 8,033,023 | B2 | 10/2011 | Johnson | |
| 8,166,661 | B2 * | 5/2012 | King | 30/527 |
| 8,205,343 | B2 | 6/2012 | Winter et al. | |
| 8,205,344 | B2 | 6/2012 | Stevens | |
| 8,273,205 | B2 | 9/2012 | Murgida | |
| 8,307,552 | B1 | 11/2012 | Drouillard | |
| 8,484,852 | B2 * | 7/2013 | King | 30/34.2 |
| 8,499,459 | B2 * | 8/2013 | Efthimiadis et al. | 30/34.1 |
| 8,590,162 | B2 | 11/2013 | Park et al. | |
| 8,640,342 | B2 * | 2/2014 | Murgida | 30/50 |
| 8,732,955 | B2 * | 5/2014 | Howell et al. | 30/50 |
| 8,769,825 | B2 * | 7/2014 | Howell et al. | 30/50 |
| 8,789,282 | B2 * | 7/2014 | Wilson et al. | 30/74 |
| 8,793,880 | B2 * | 8/2014 | Taub et al. | 30/50 |
| 8,844,145 | B2 * | 9/2014 | Psimadas et al. | 30/526 |
| 2002/0059729 | A1 | 5/2002 | Ikuta et al. | |
| 2002/0138992 | A1 | 10/2002 | Richard | |
| 2002/0157255 | A1 | 10/2002 | Coffin | |
| 2003/0046819 | A1 | 3/2003 | Ferraro | |
| 2003/0154603 | A1 | 8/2003 | Guimont et al. | |
| 2003/0200659 | A1 | 10/2003 | Coffin et al. | |
| 2003/0200660 | A1 | 10/2003 | Pennella et al. | |
| 2003/0205858 | A1 | 11/2003 | Hall | |
| 2004/0010918 | A1 | 1/2004 | Orloff et al. | |
| 2004/0177519 | A1 | 9/2004 | Tomassetti et al. | |
| 2005/0039338 | A1 | 2/2005 | King | |
| 2005/0207837 | A1 | 9/2005 | Kosh et al. | |
| 2005/0278954 | A1 | 12/2005 | Orloff et al. | |
| 2006/0037197 | A1 | 2/2006 | Hawes et al. | |
| 2006/0080837 | A1 | 4/2006 | Johnson et al. | |
| 2006/0080838 | A1 | 4/2006 | Johnson | |
| 2006/0283025 | A1 | 12/2006 | Follo et al. | |
| 2007/0151106 | A1 | 7/2007 | Steunenberg et al. | |
| 2007/0204932 | A1 | 9/2007 | Freed | |
| 2007/0289139 | A1 | 12/2007 | Peyser et al. | |
| 2008/0155831 | A1 | 7/2008 | Royle | |
| 2008/0189964 | A1 | 8/2008 | Bozikis | |
| 2008/0196251 | A1 | 8/2008 | Royle | |
| 2009/0000126 | A1 | 1/2009 | Kraus | |
| 2009/0038167 | A1 | 2/2009 | Peyser | |
| 2009/0235539 | A1 | 9/2009 | Wonderley | |
| 2010/0011583 | A1 | 1/2010 | Efthimiadis et al. | |
| 2010/0043242 | A1 | 2/2010 | Stevens | |
| 2010/0083505 | A1 | 4/2010 | Royle et al. | |
| 2011/0138586 | A1 | 6/2011 | Gompert et al. | |
| 2011/0192031 | A1 | 8/2011 | Coresh | |
| 2011/0247217 | A1 | 10/2011 | Johnson et al. | |
| 2012/0060382 | A1 | 3/2012 | Beugels et al. | |
| 2012/0073554 | A1 | 3/2012 | Victor et al. | |
| 2012/0124840 | A1 | 5/2012 | Iaccarino et al. | |
| 2012/0210586 | A1 | 8/2012 | Lelieveld et al. | |
| 2012/0297625 | A1 | 11/2012 | Madden | |
| 2013/0025578 | A1 | 1/2013 | Jones | |
| 2013/0081289 | A1 | 4/2013 | Wain | |
| 2013/0174821 | A1 | 7/2013 | Jones | |
| 2014/0083265 | A1 | 3/2014 | Provost et al. | |
| 2014/0109735 | A1 | 4/2014 | Shepperson | |
| 2015/0158192 | A1 | 6/2015 | Tucker | |
| 2015/0174776 | A1 | 6/2015 | Hawes | |
| 2015/0190935 | A1 | 7/2015 | Griffin | |
| 2015/0190936 | A1 | 7/2015 | Griffin | |
| 2015/0290819 | A1 | 10/2015 | Giannopoulos | |
| 2015/0306777 | A1 | 10/2015 | Georgakis | |
| 2015/0314465 | A1 | 11/2015 | Giannopoulos | |
| 2015/0314466 | A1 | 11/2015 | Papadopoulos-Papageorgis | |

FOREIGN PATENT DOCUMENTS

| | | |
|---|---|---|
| EP | 2123410 | 11/2009 |
| GB | 1460732 | 1/1977 |
| GB | 2030909 | 4/1980 |
| WO | 2012158143 | 11/2012 |
| WO | 2014051843 | 4/2014 |

OTHER PUBLICATIONS

Search Report—Corresponding European Application No. 13864593, dated Jul. 8, 2016, 7 pages.

* cited by examiner

FIG. 14
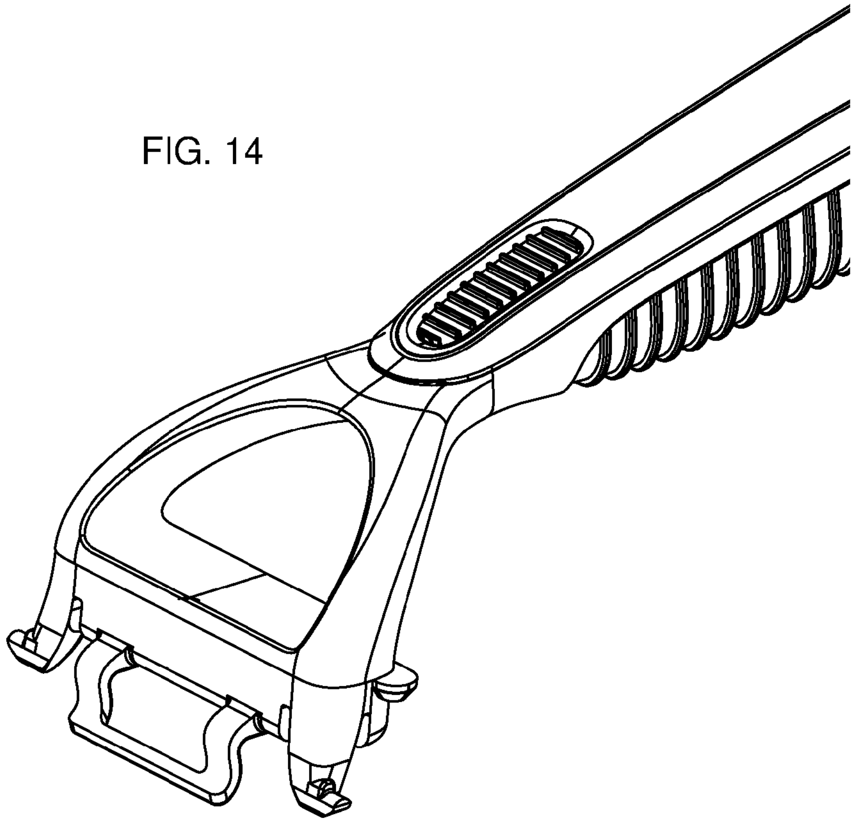
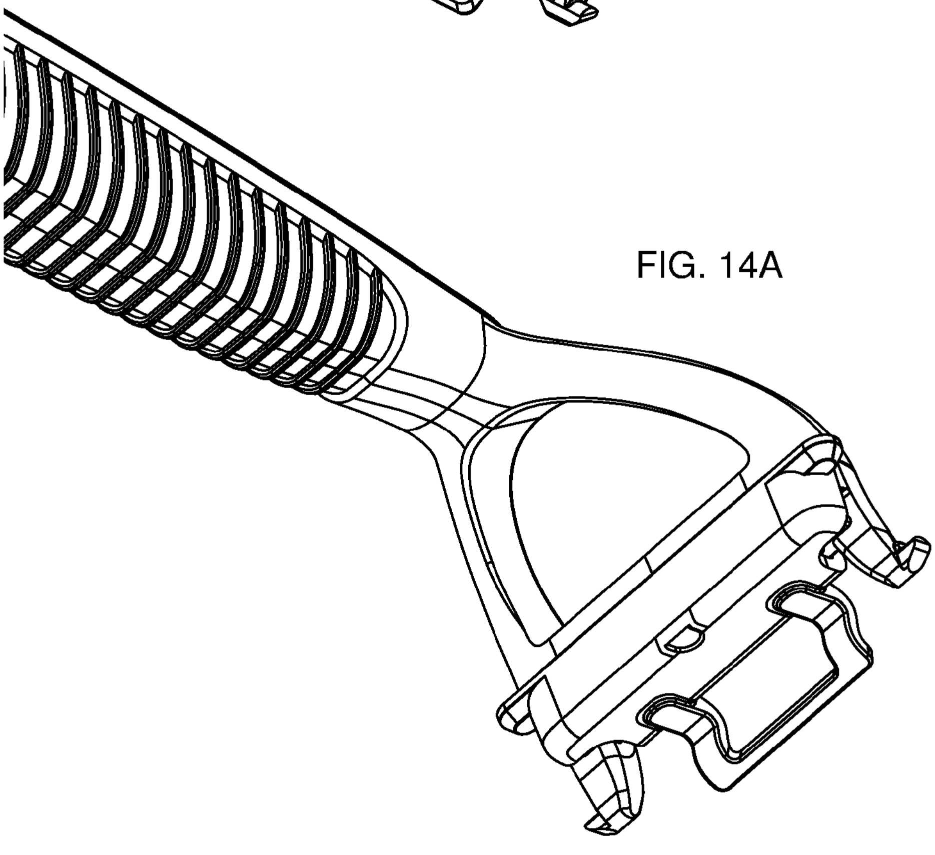
FIG. 14A

SHAVING SYSTEMS

BACKGROUND

The invention relates to shaving systems having handles and replaceable blade units. Shaving systems often consist of a handle and a replaceable blade unit in which one or more blades are mounted in a plastic housing. After the blades in a blade unit have become dull from use, the blade unit is discarded and replaced on the handle with a new blade unit. Such systems often include a pivoting attachment between the blade unit and handle, which includes a pusher and follower configured to provide resistance during shaving and return the blade unit to a “rest” position when it is not in contact with the user’s skin.

SUMMARY

In general, the present disclosure pertains to shaving systems and to replaceable shaving assemblies for use in such systems. The systems include a flexible return element, e.g., of an elastomeric material, which provides the resistance and return force that are often provided by a pusher and follower mechanism in prior art shaving systems.

In one aspect, the invention features a replaceable shaving assembly comprising (a) a blade unit and (b) an interface element configured to removeably connect the blade unit to a handle, the blade unit being pivotably mounted on the interface unit. The interface element comprises a flexible return element configured to provide a return force between the blade unit and handle.

Some implementations include one or more of the following features. The return element may be configured to bias the blade unit towards a rest position with respect to a pivot axis that is generally parallel to a long axis of the blade unit. The return element may be formed of or include a thermoplastic elastomer or thermoplastic urethane. The interface element may include a substantially rigid portion defining a cavity configured to receive a distal end of the handle. The return element may be molded onto or attached to the substantially rigid portion of the interface element. In some implementations the return element is generally U-shaped when viewed looking towards the back of the blade unit, in which case a base portion of the U-shape may be configured to engage a surface of the blade unit. The return element may be configured to bend or buckle upon rotation of the blade unit toward an upper surface of the handle.

In another aspect, the invention features a shaving system that includes (a) a handle having a distal end and a proximal end; and (b) a shaving assembly, mounted on the distal end of the handle, the shaving assembly including an interface element configured to connect the blade unit to the handle, and a blade unit that is pivotably mounted on the interface element. As in the first aspect, the interface element includes a flexible return element configured to provide a return force between the blade unit and handle.

Some implementations of this aspect of the invention may include any one or more of the features discussed above or elsewhere herein. In addition, in this aspect the shaving assembly may be either mounted removably on the handle, allowing it to be replaceable, or mounted fixedly to the handle. In the latter case, the shaving system would be designed to be disposable as a whole, rather than the shaving assembly being disposable and the handle being intended for long-term use.

In other aspects, the invention features methods of using the shaving systems disclosed herein. For example, the invention features a method of shaving comprising contacting the skin with the blade unit of a shaving system that includes (a) a handle having a distal end and a proximal end, and (b) pivotably mounted on the handle, a replaceable shaving assembly that includes a blade unit and an interface element configured to removeably connect the blade unit to the handle, the interface element comprising a flexible return element configured to provide a return force between the blade unit and handle.

DESCRIPTION OF THE DRAWINGS

FIGS. 14-14A are perspective views of a handle and interface element showing an alternative geometry for the return element.

DETAILED DESCRIPTION

Figure 1:
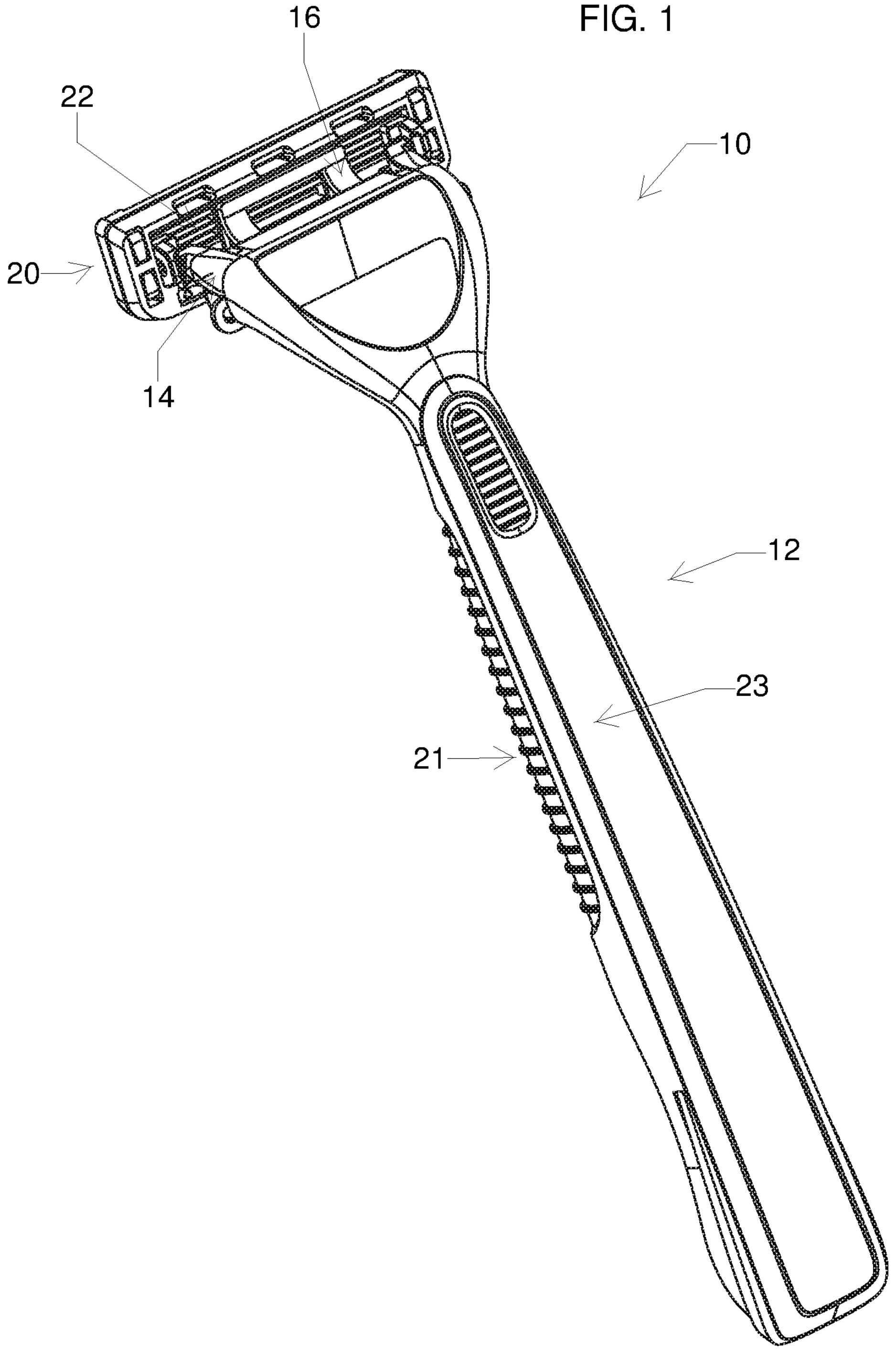
FIGS. 1-3 are perspective views of a shaving system according to one implementation, with the blade unit in various rotational positions.
Figure 2:
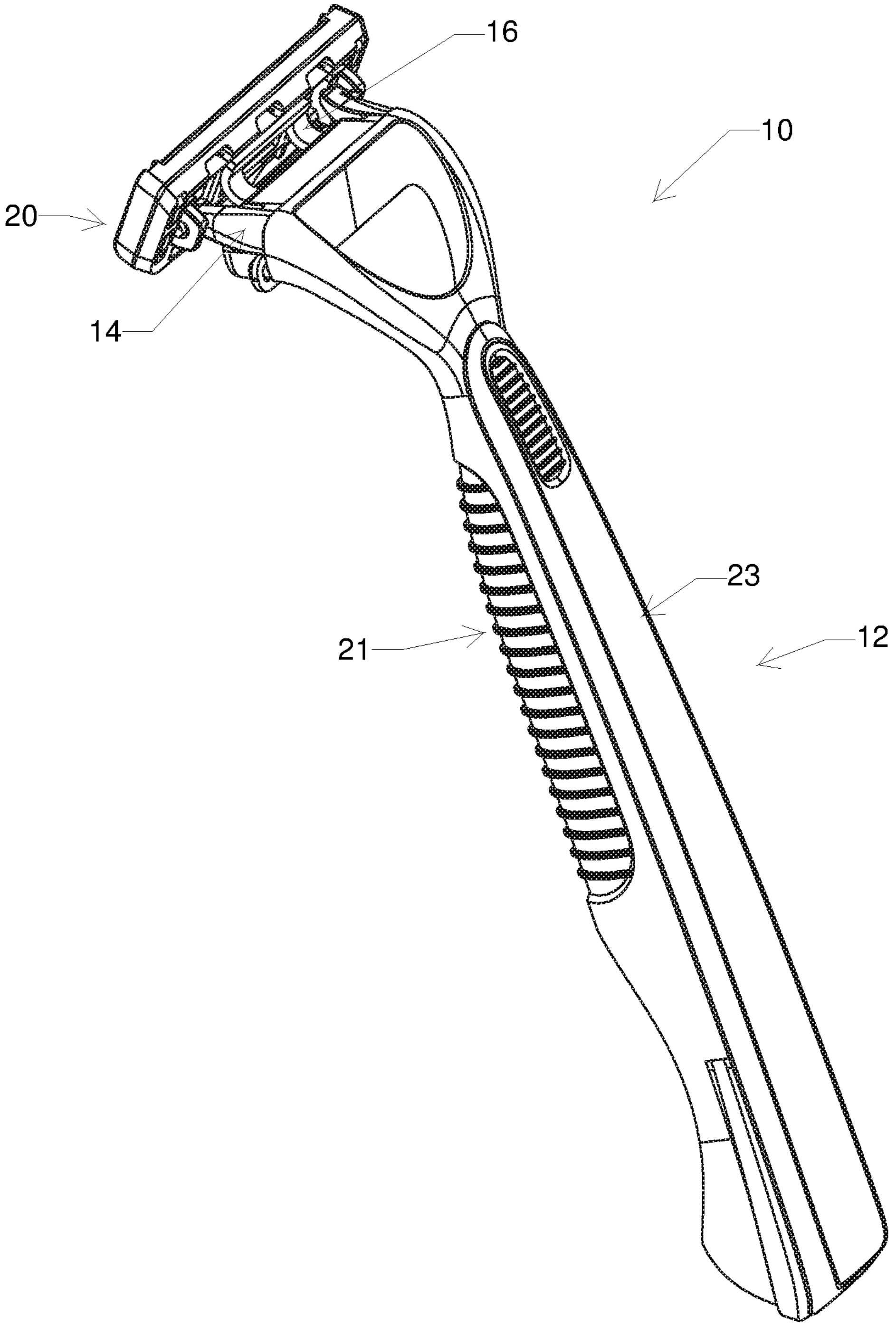
Figure 3:
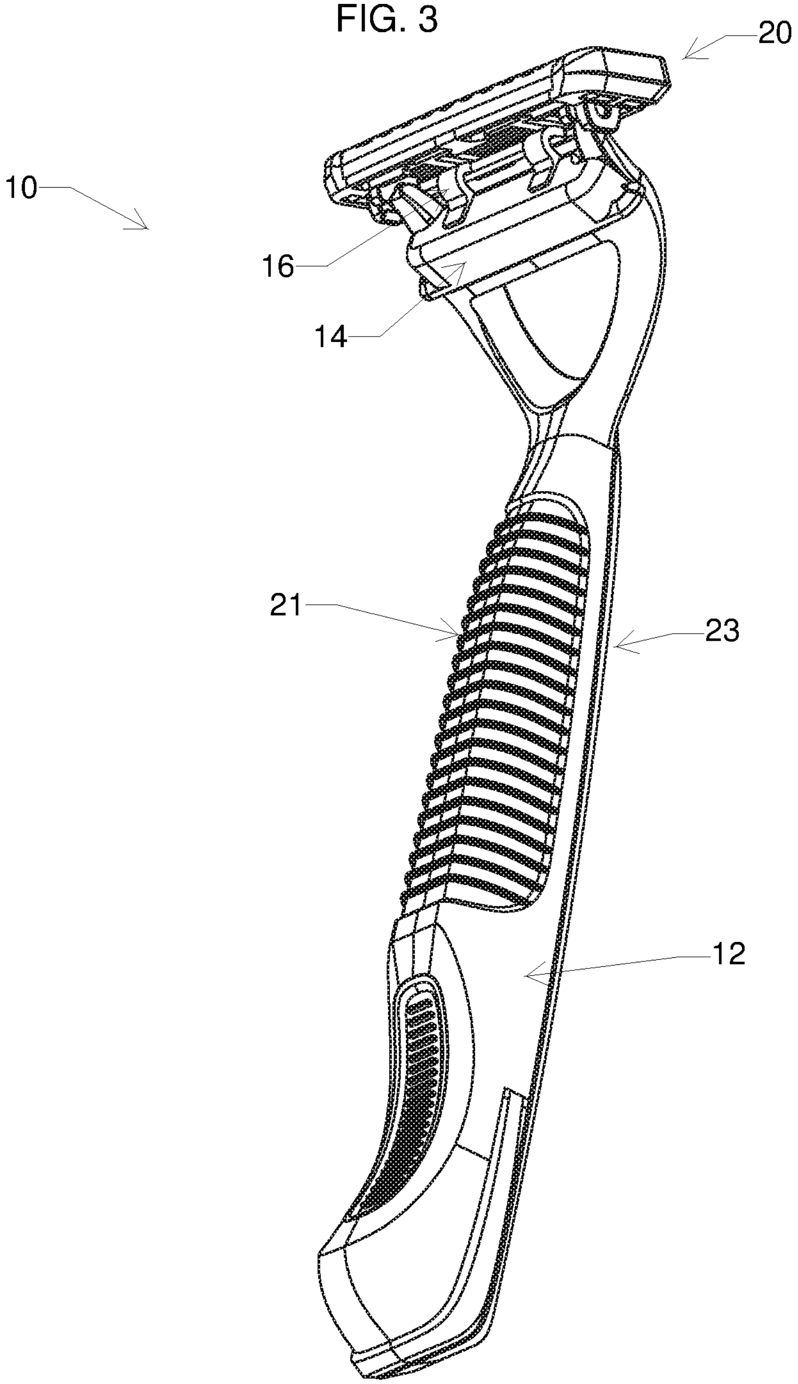

FIGS. 1-3 show a shaving system 10 that includes a handle 12, an interface element 14, a return element 16, and a blade unit 20 that includes a plurality of blades 22 (FIG. 1) and that is pivotably mounted on the interface element. The interface element includes a generally rigid body that defines a cavity (not shown) dimensioned to receive the distal end of handle 12. Generally, the interface element 14, the return element 16, and blade unit 20 are sold to the consumer as an integrated replaceable shaving assembly.

Figure 4:
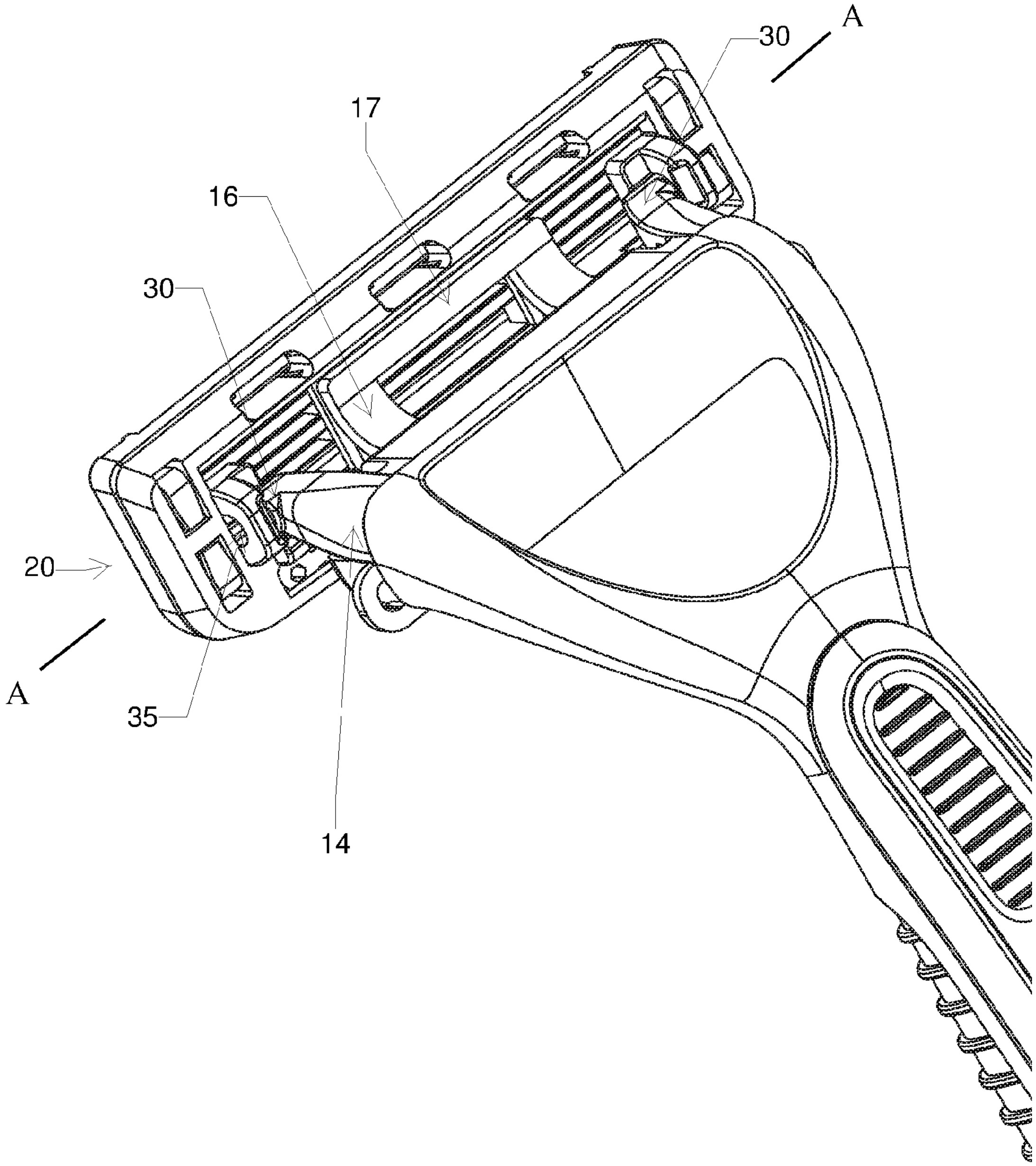
FIG. 4 is an enlarged perspective view of the shaving assembly and a portion of the handle of the shaving system shown in FIG. 1. The longitudinal axis of the blade unit of the shaving system is indicated by line A-A.
Figure 5:
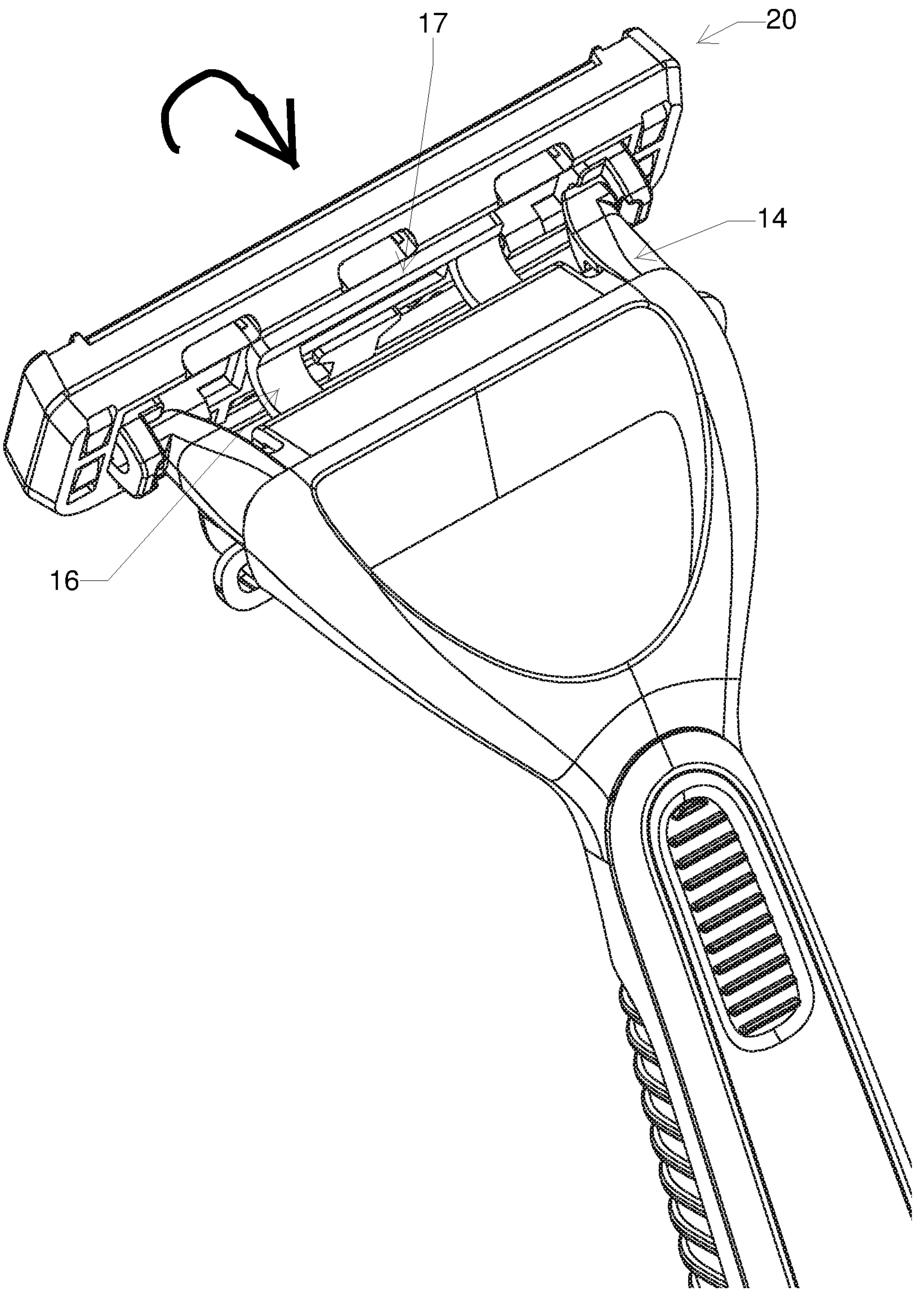
FIG. 5 is an enlarged perspective view similar to that of FIG. 4, showing the blade unit being rotated toward the upper part of the handle, as indicated by the arrow.
Figure 5A:
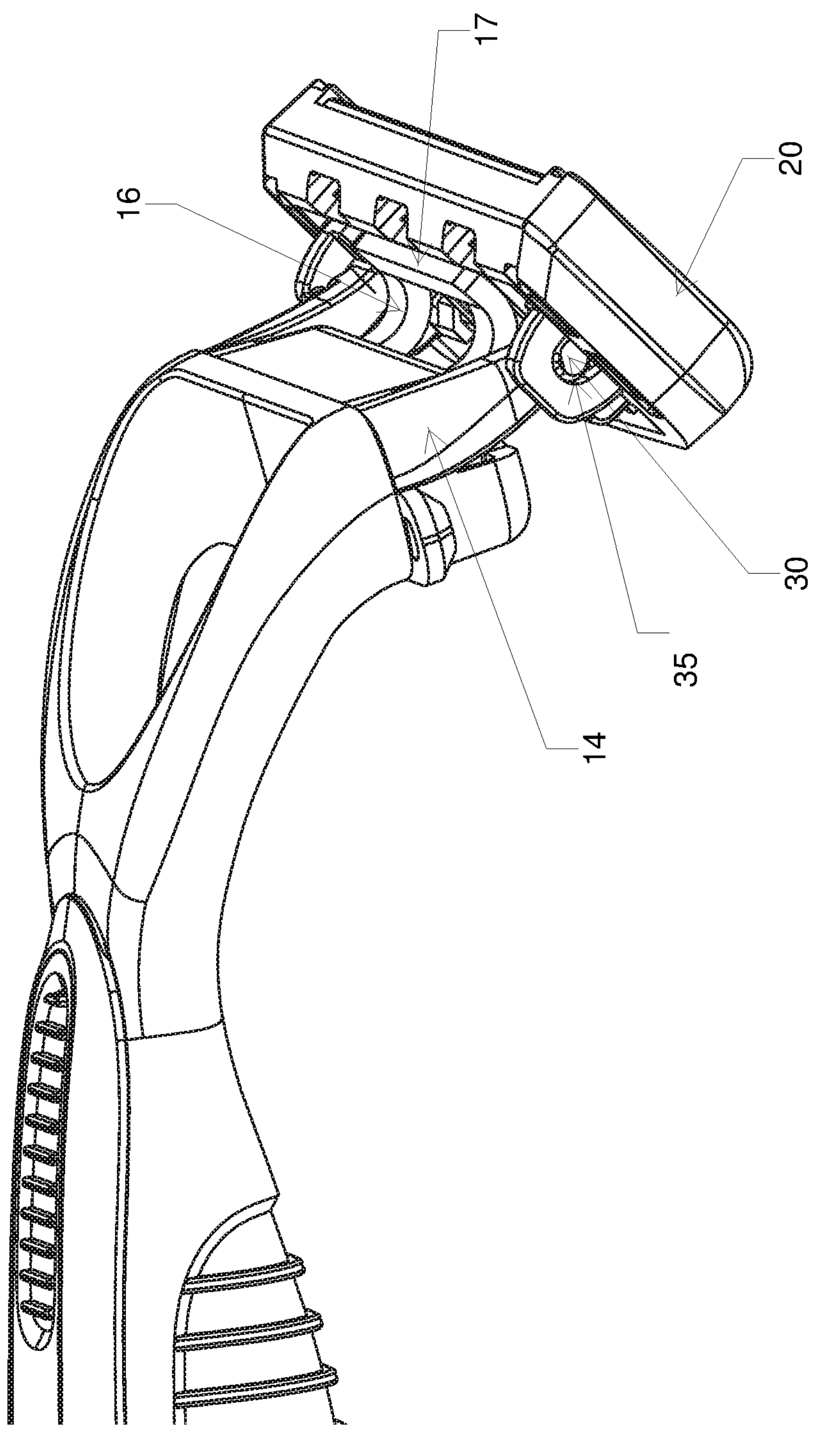
FIGS. 5A and 5B show the same rotational position of the blade unit from a different viewpoint.
Figure 5B:
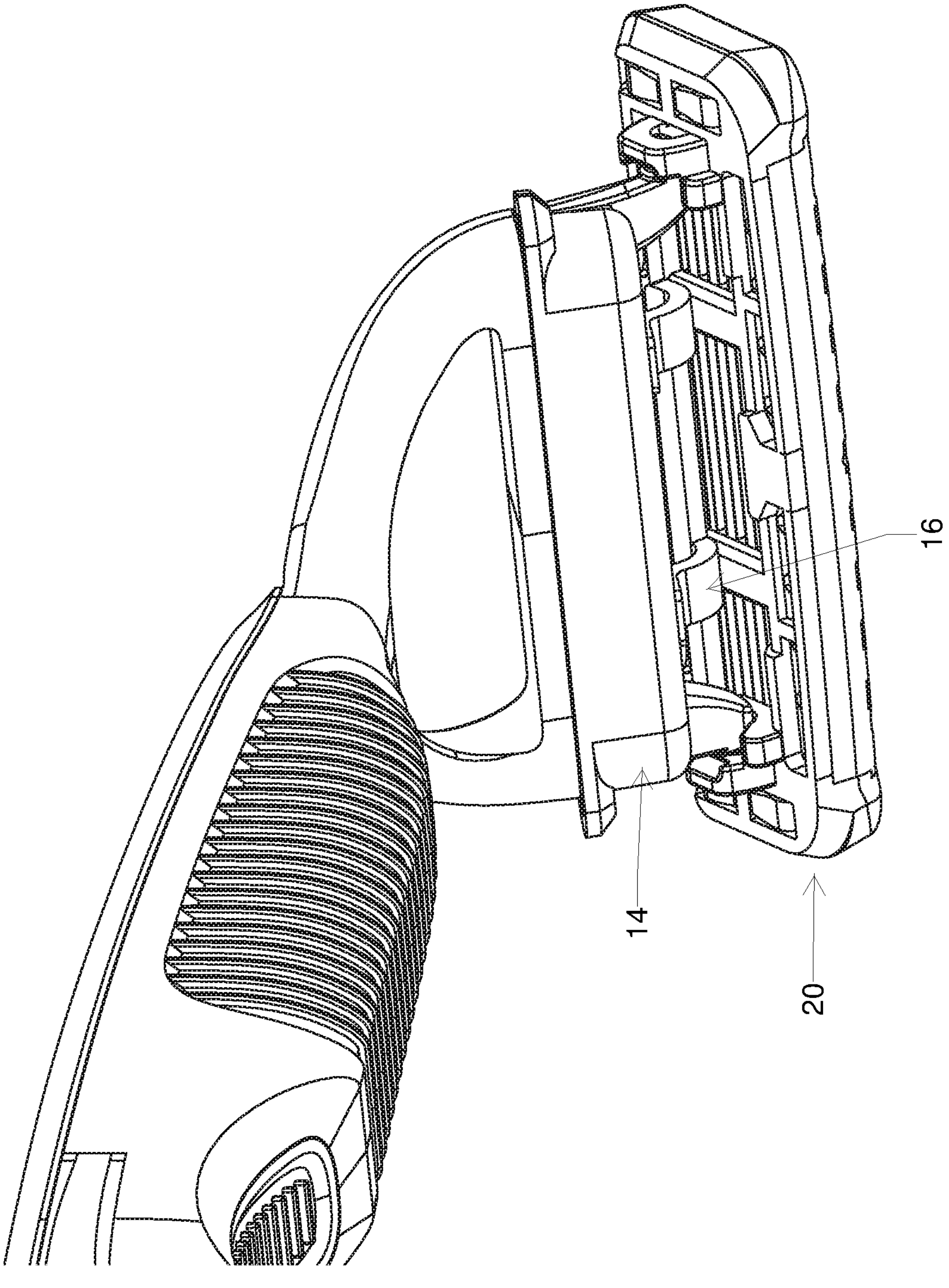
Figure 12:
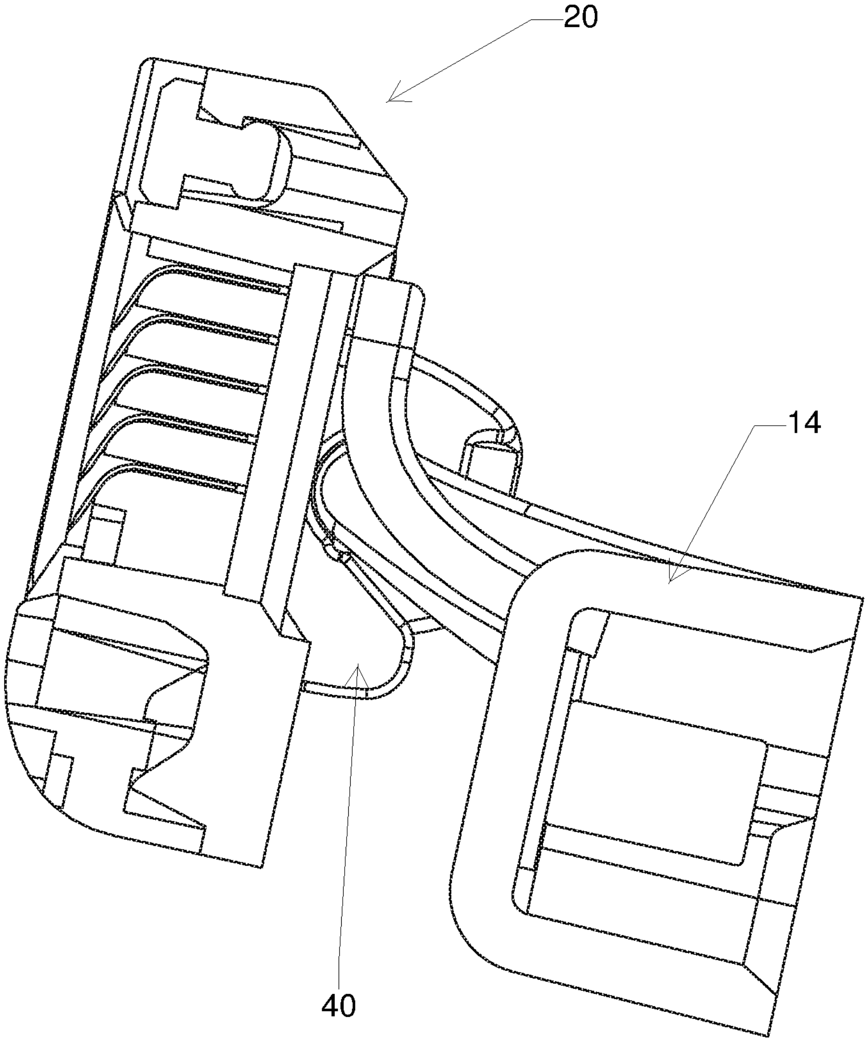
FIG. 12 is a diagrammatic side plan view showing an example of a pivot stop that may be used in the shaving systems disclosed herein.

Referring to FIG. 4, the blade unit 20 is mounted on interface element 14 by the positioning of a pair of fingers 30 (FIG. 7A) which extend from the interface element 14 into receiving bores 35 (FIGS. 5A, 5B) on the blade unit 20. The receiving bores 35 may be molded integrally with the blade unit 20. This attachment allows pivoting of the blade unit with respect to the interface unit and thus the handle. A blade unit pivot stop (e.g., a stop flange 40 as shown in FIG. 12) may be integrally formed with the blade unit 20 to limit the pivoting of the blade unit 20. Pivoting of the blade unit 20 is about an axis that is generally parallel to the long axis of the blade unit and is generally positioned to allow the blade unit 20 to follow the contours of a user's skin during shaving. Referring to FIGS. 8A-8D, preferably the angle of blade unit 20 with respect to handle 12 is about 15 degrees at rest, and the angle of the blade unit with respect to the skin surface can range from approximately 15° to 105° during shaving. The handle 12 provides a manner in which the shaving system can be manipulated and leverage can be applied to achieve desired shaving results.

The blade unit 20 is shown in three different rotational orientations in FIGS. 1-3. In FIG. 1, the blade unit is preloaded by the return element and is in an at rest position, pivoted slightly toward a bottom surface 21 of the handle; in FIG. 2, the blade unit is pivoted slightly toward a top surface 23 of the handle, and in FIG. 3 the blade unit is pivoted further toward the top surface 23. These positions are representative of the normal range of pivoting motion of the blade unit. As the blade unit pivots between these positions, the return element 16 flexes between an extended position (FIG. 1) and a bent position (FIG. 3), as will be discussed further below.

Figure 7:
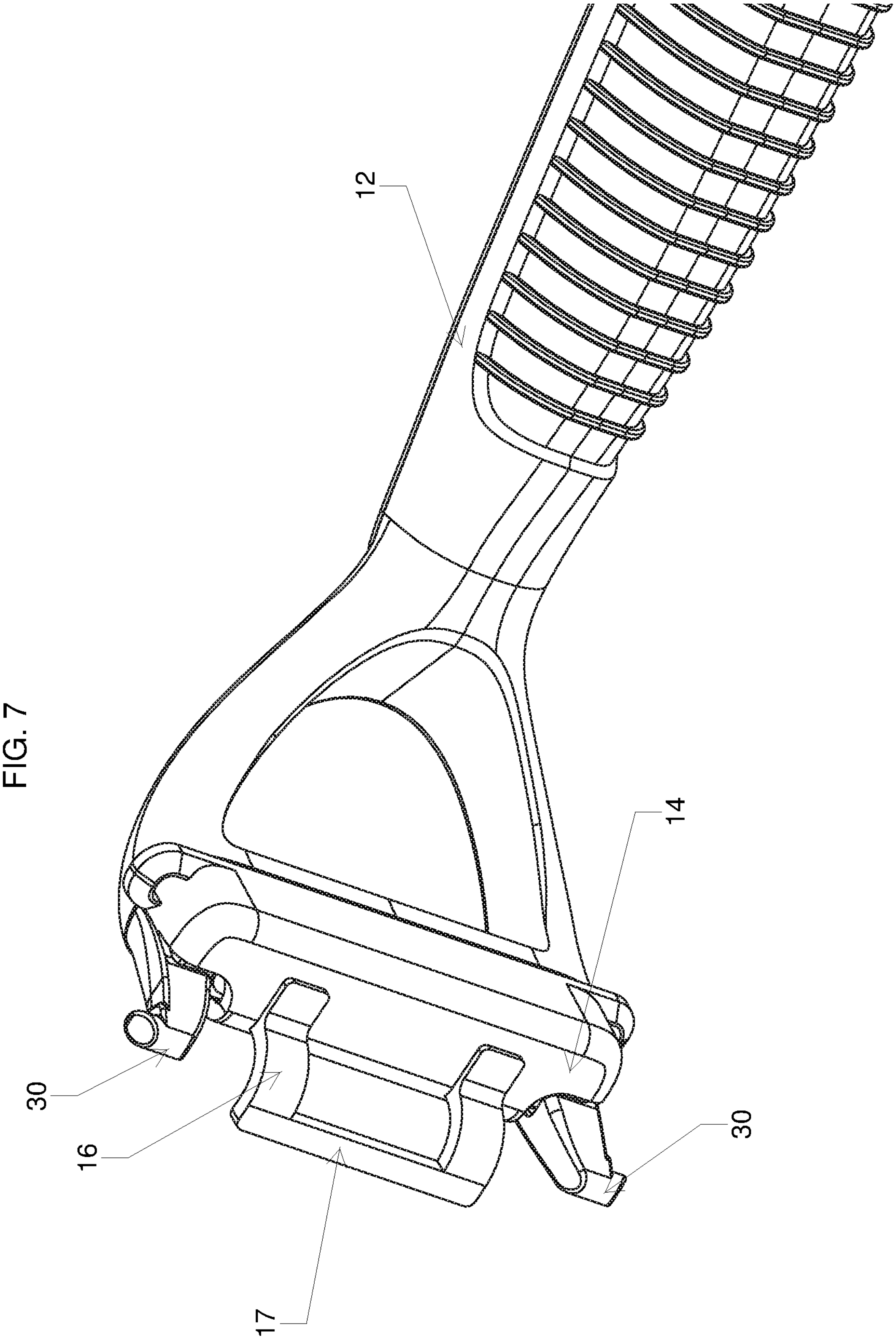
FIGS. 7 and 7A show the handle, interface element and return element with the blade unit removed for clarity.
Figure 7A:
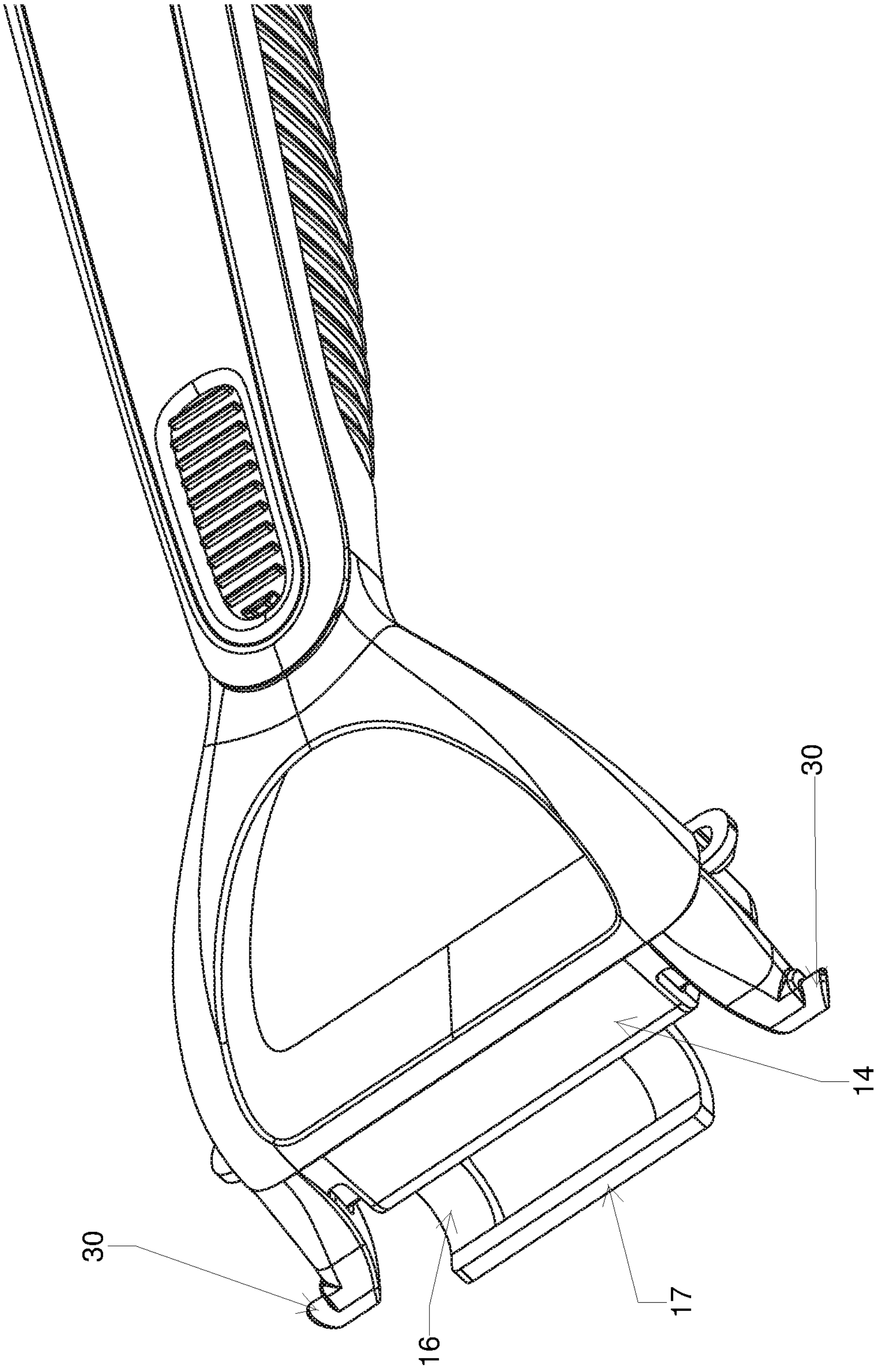
Figure 8A:
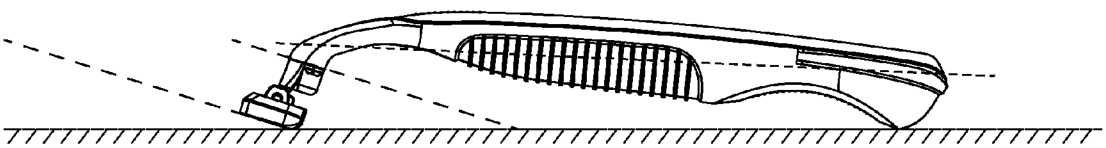
FIGS. 8A-8D are diagrammatic views illustrating how the angle of the blade unit with respect to the handle at rest, and to the skin surface during shaving, is measured.
Figure 8B:
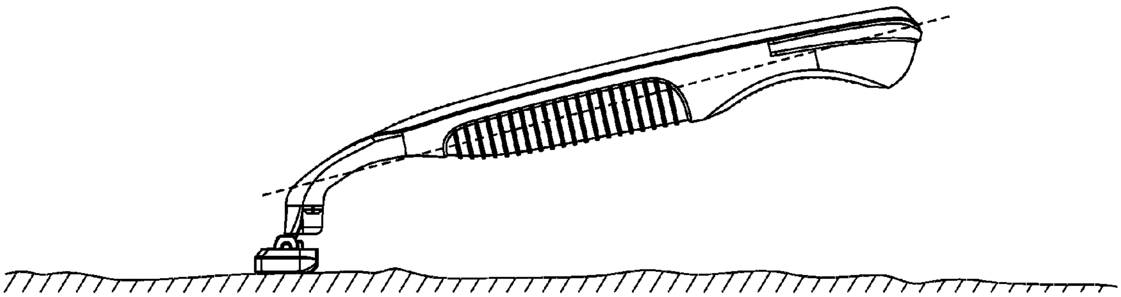
Figure 8C:
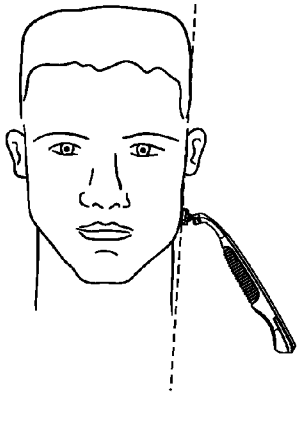
Figure 8D:
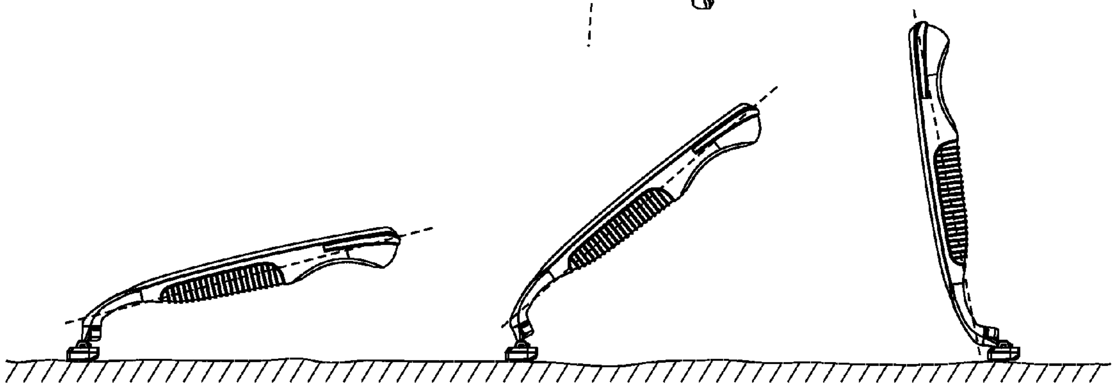

Referring to FIGS. 7 and 7A, the return element 16 is mounted on interface element 14 and extends generally downwardly and outwardly from the lower surface 15 of the interface element. The return element 16 is generally U-shaped, and includes a generally straight central portion 17 that is configured to engage the back surface of the blade unit (e.g., as shown in FIG. 4).

Figure 6:
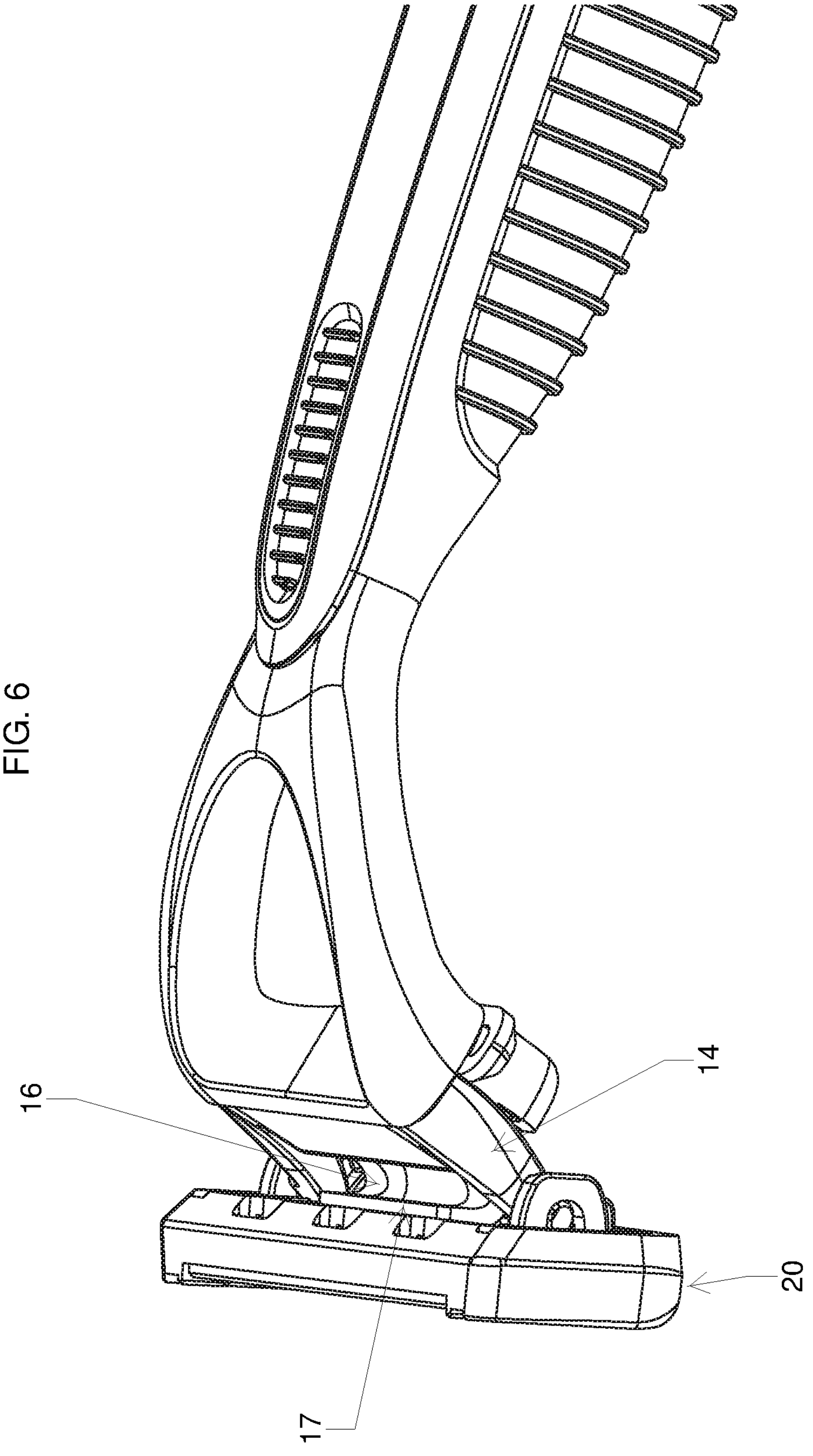
FIGS. 6 and 6A show the shaving assembly with the blade unit rotated further toward the upper part of the handle.
Figure 6A:
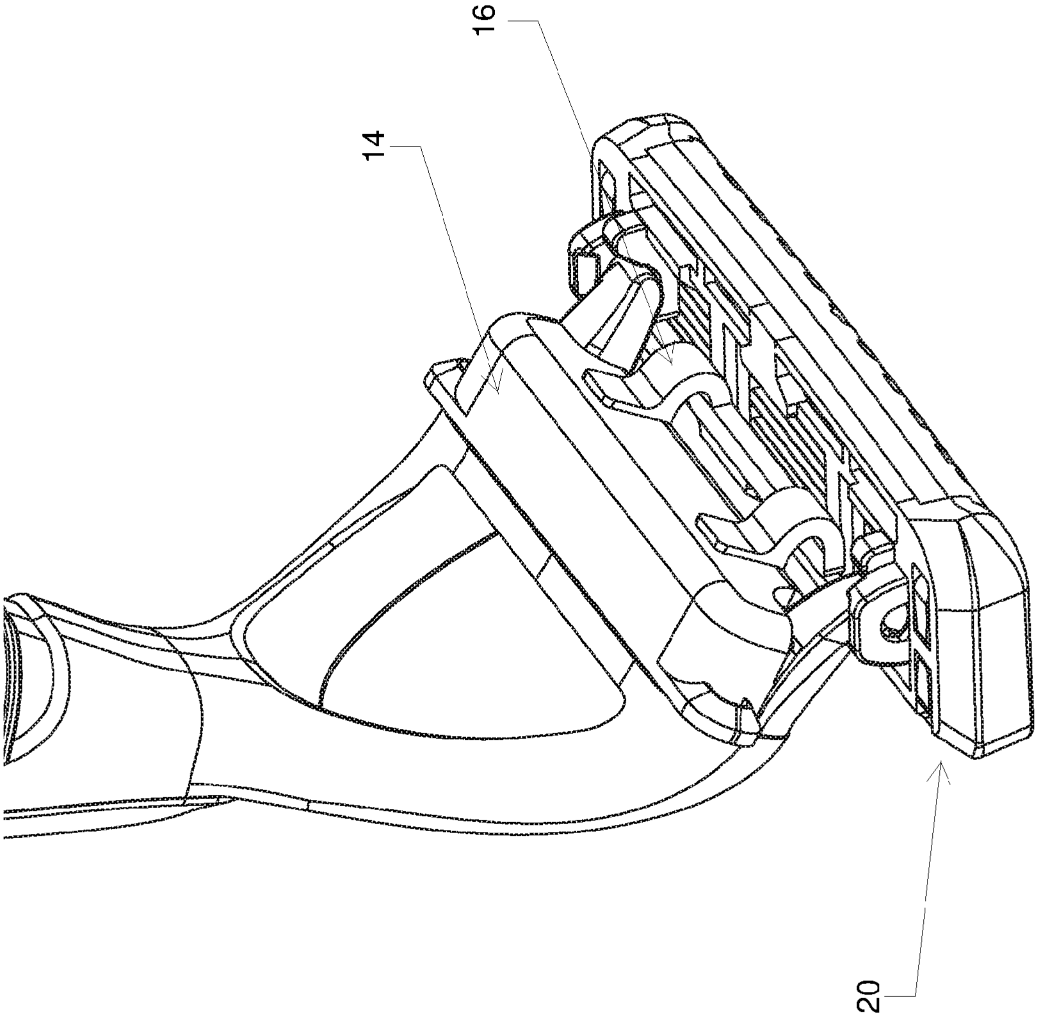

As shown in detail in FIGS. 4-6A, as the blade unit pivots toward the upper surface of the handle, the return element 16 deforms more and more, until it finally reaches the bent position shown in FIGS. 6 and 6A. As it deforms, the return element 16 provides resistance during shaving, limiting the free pivoting of the blade unit about the pivot axis described above. In addition, the return element 16 provides a return force that biases the blade unit 16 towards its rest position, in the same manner that resistance and return force are typically provided by a pusher/follower assembly.

The return element 16 may be integrally molded with the interface element 14, e.g., by co-molding the elastomer with the rigid plastic used to form the body of the interface element. It is noted that the term "co-molding," as used herein, includes transfer molding, multi-material molding, and other techniques suitable for molding two or more different materials into a single part.

The return element 16 can be formed, for example, from synthetic or natural rubber materials. Suitable materials are well known in the shaving system art, and include thermoplastic elastomers, for example, polyether-based thermoplastic elastomers (TPEs) available from Kraiburg HTP, thermoplastic urethanes (TPUs), silicones, polyether-based thermoplastic vulcanizate elastomer (TPVs) available from Exxon Mobil Corporation under the tradename Santoprene™. The elastomeric material is selected to provide a desired degree of restoring force and durability. In some implementations, the elastomer has a Durometer of less than about 45 Shore A, e.g., from about 20 to 90 Shore A.

The return element 16 is designed such that its geometry provides an applied load as assembled that is sufficient to return the blade unit to its home position, e.g., against the stop on the interface element (e.g., the stop flange 40 shown in FIG. 12), when not in use, for example, when the handle is being held without any load on the blade unit. Preferably the pretensioned load is typically at least 5 grams, e.g., 5 to 50 grams, and the load during shaving is from about 5 to 100 grams.

The handle 12 provides a manner in which the shaving system can be manipulated and leverage can be applied to achieve desired shaving results. Preferably, the handle 12 is designed to be connected to the interface element 14 so as to allow for easy removal and attachment. This could be accomplished in a number of manners, such as a mechanical locking mechanism, magnetic interaction, etc. For example, the handle interface element 14 and handle 12 can interface in the manner discussed in U.S. Ser. No. 61/651,732, filed May 25, 2012, and U.S. Ser. No. 13/802,546, filed Mar. 13, 2013, the full disclosures of which are incorporated herein by reference. Also, while the interface element is shown as a female element and the handle as a male element, the opposite configuration may be used if desired.

The hard portions of handle 12, the housing of blade unit 20, and the interface element 14 can be made of any suitable material including, for example, metal, acetal (POM), acrylonitrile butadiene styrene (ABS), polyethylene terephthalate (PET or PETE), high density (HD) PETE, thermoplastic polymer, polypropylene, oriented polypropylene, polyurethane, polyvinyl chloride (PVC), polytetrafluoroethylene (PTFE), polyester, high-gloss polyester, nylon, or any combination thereof.

A number of embodiments have been described. Nevertheless, it will be understood that various modifications may be made without departing from the spirit and scope of the disclosure.

Figure 9:
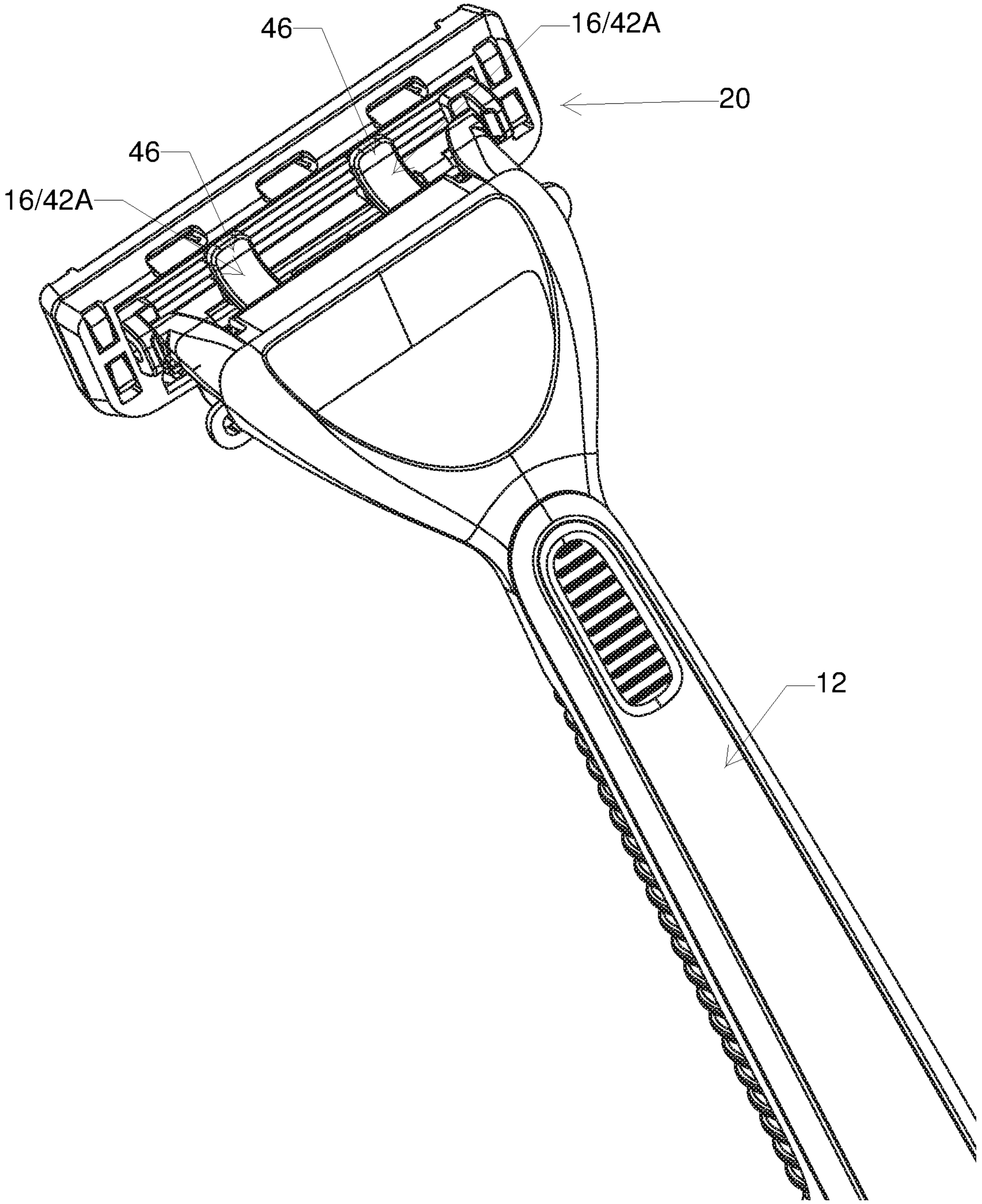
FIGS. 9 and 10 are perspective views of shaving systems according to alternate embodiments.
Figure 10:
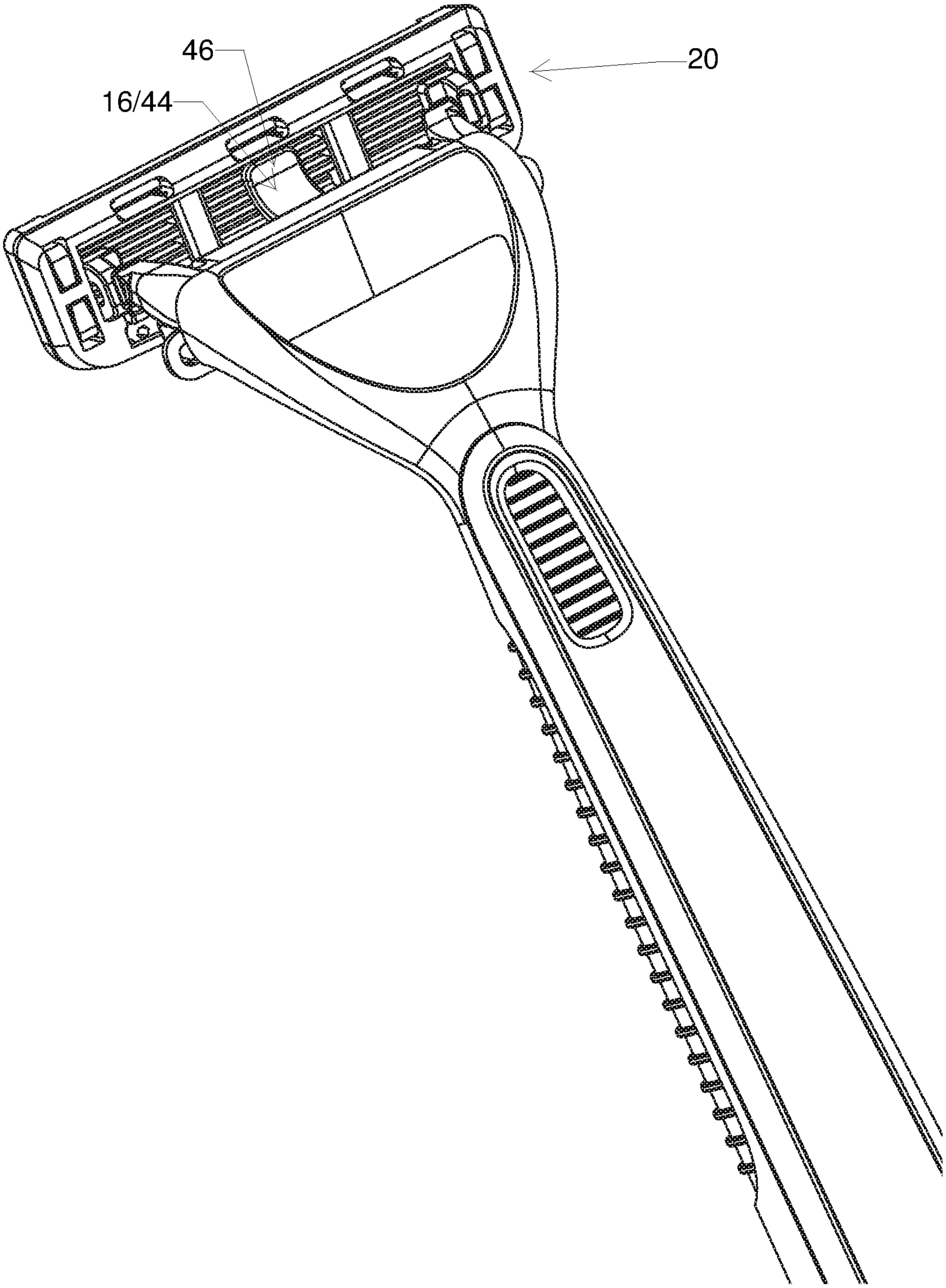
Figure 11A:
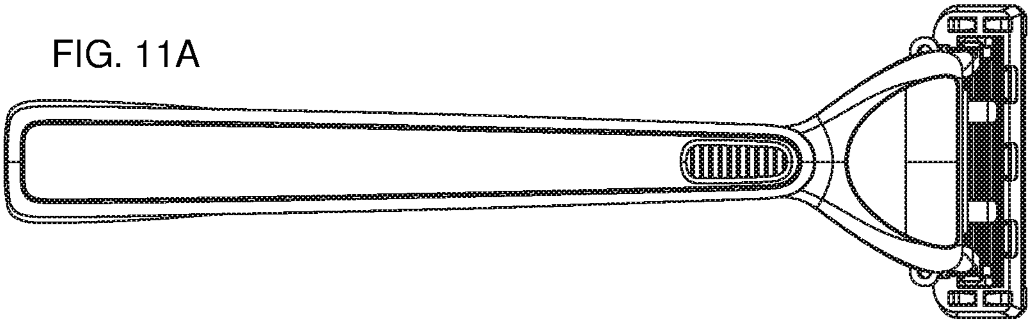
FIGS. 11A-11C are rear plan views of the shaving systems shown in FIGS. 9, 1 and 10, respectively.
Figure 11B:
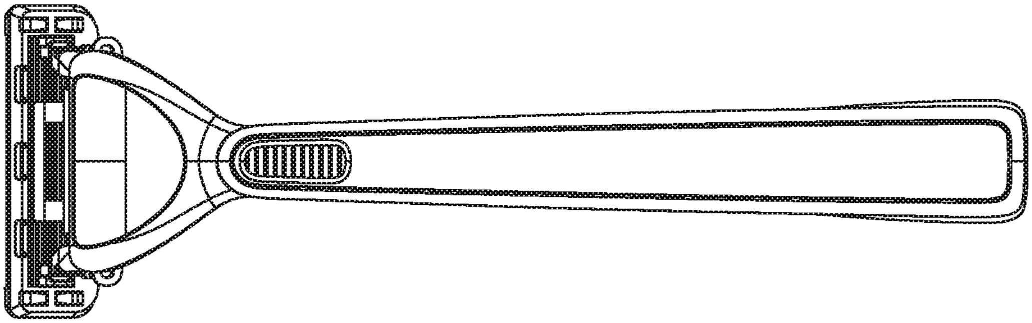
Figure 11C:
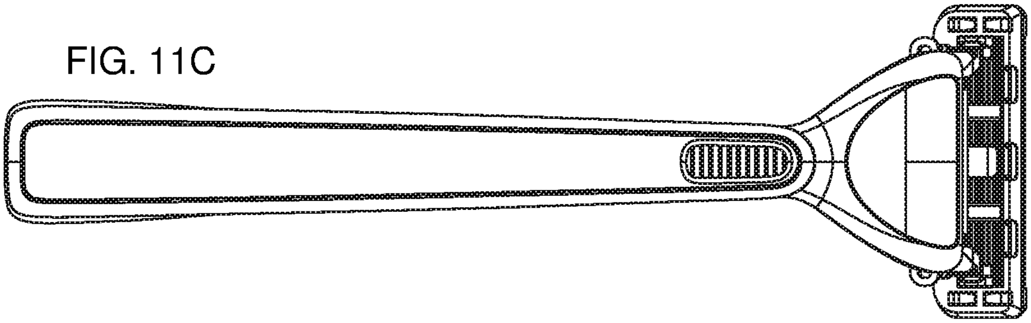

For example, the return element may have a different shape, for example the return element 16 is in the form of two separate fingers 42*a*, 42*b*, as shown in FIG. 9, or by a single, centrally disposed finger 44, as shown in FIG. 10. In this case, the fingers are configured to deform in the same manner described above and provide a similar restoring force. In these implementations, as well as in some implementations in which the return element is generally U-shaped, the back surface of blade unit 20 may include one or more features 46 which are positioned to act as a stop for the distal end of the return element 16. Support features 46 may enhance the ability of the return element 16 to bend or buckle in response to rotational forces.

Figure 13:
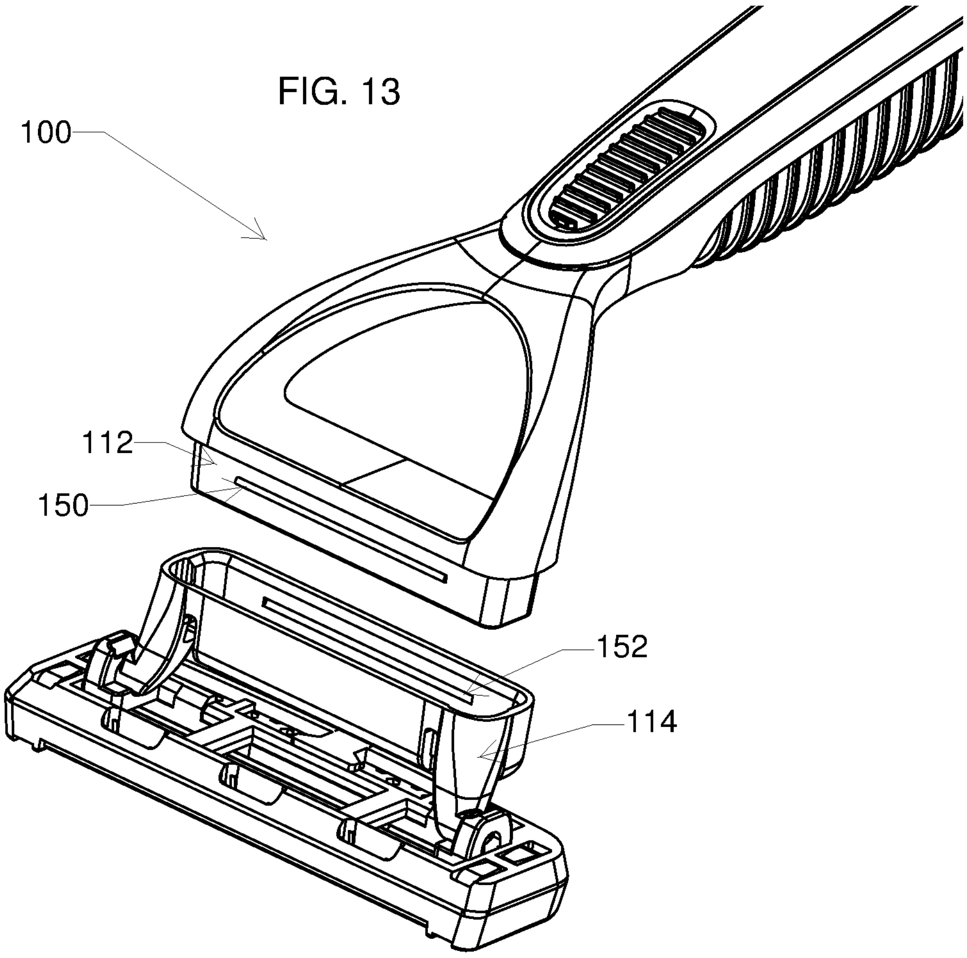
FIGS. 13-13A are perspective views of an embodiment in which the shaving assembly is designed to be permanently attached to the handle.
Figure 13A:
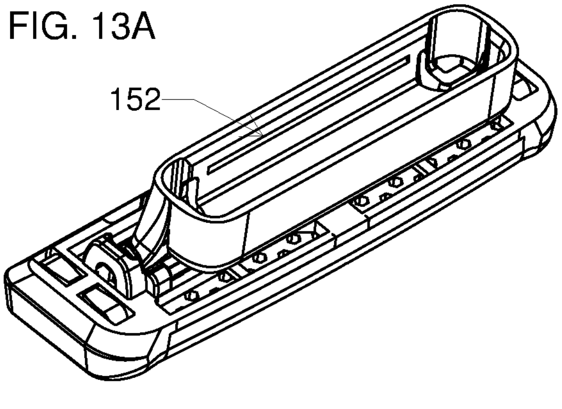

Also, while removable shaving assemblies have been discussed above, in some implementations the shaving system is designed to be disposable as a whole. In these cases, the shaving assembly is affixed to the handle in a manner that is not intended for the consumer to remove, e.g., by fixedly mounting the interface element on the distal end of the handle. This may be accomplished, for example, by engagement of corresponding mechanical locking features on the handle and interface element, by welding (e.g., ultrasonic welding), by molding the interface element integrally with the handle, or by any other desired mounting technique. An example of a disposable shaving system 100 is shown in FIG. 13, and the shaving assembly for such a system is shown in FIG. 13A. In this case, the handle 112 includes protrusions 150 (only one of which is shown, the other being on the opposite side of the handle), and the interface element includes corresponding locking indentations 152.

The return element may also have various shapes when seen from the side. For example, the side profile may define a single curve, as shown in FIGS. 7 and 7A, or a double-curved, "S" shape, as shown in FIGS. 14 and 14A. The latter shape may be used to move the return force further from the pivot point of the blade unit to better balance the blade unit during shaving.

Accordingly, other embodiments are within the scope of the following claims.

What is claimed is:

1. A method of shaving comprising:

contacting the skin with the blade unit of a shaving system, the shaving system comprising a handle having a distal end and a proximal end, and a replaceable shaving assembly that includes a blade unit and an interface element configured to removeably connect the blade unit to the handle, the interface element comprising an elastomeric return element configured to provide a return force between the blade unit and handle, and the return element being configured to buckle upon rotation of the blade unit toward an upper surface of the handle and including a pair of spaced first and second elastomeric portions extending from the interface element towards the blade unit in a direction generally perpendicular to a longitudinal axis of the blade unit, joined by a third elastomeric portion disposed generally parallel to the longitudinal axis, wherein the first, second and third portions of the return element form an integral whole that is generally U-shaped, and an entire length of the third portion abuts a surface of the blade unit.

2. A replaceable shaving assembly comprising:

a blade unit; and an interface element configured to removeably connect the blade unit to a handle, on which the blade unit is pivotably mounted, the interface element comprising an elastomeric return element configured to provide a return force between the blade unit and handle;

wherein the return element is configured to buckle upon rotation of the blade unit toward an upper surface of the handle and includes a pair of spaced first and second elastomeric portions extending from the interface element towards the blade unit in a direction generally perpendicular to a longitudinal axis of the blade unit, joined by a third elastomeric portion disposed generally parallel to the longitudinal axis;

wherein the first, second and third portions of the return element form an integral whole that is generally U-shaped, and an entire length of the third portion abuts a surface of the blade unit.

3. The shaving assembly of claim 2 wherein the return element is configured to bias the blade unit towards a rest position with respect to a pivot axis that is generally parallel to a long axis of the blade unit.

4. The shaving assembly of claim 2, wherein the return element comprises a thermoplastic elastomer or thermoplastic urethane.

5. The shaving assembly of claim 2 wherein the interface element comprises a substantially rigid portion defining a cavity configured to receive a distal end of the handle.

6. The shaving assembly of claim 5 wherein the return element is molded onto or attached to the substantially rigid portion of the interface element.

7. The shaving assembly of claim 2 wherein the interface element comprises pivot elements that are configured to be received by corresponding elements on the blade unit.

8. The shaving assembly of claim 2 further comprising a pivot stop formed integrally with the blade unit.

9. A shaving system comprising:

a handle having a distal end and a proximal end; and a shaving assembly, mounted on the distal end of the handle, the shaving assembly including an interface element configured to connect a blade unit to the handle, and the blade unit is pivotably mounted on the interface element, the interface element comprising an elastomeric return element configured to provide a return force between the blade unit and handle;

wherein the return element is configured to buckle upon rotation of the blade unit toward an upper surface of the handle and includes a pair of spaced first and second elastomeric portions extending from the interface element towards the blade unit in a direction generally perpendicular to a longitudinal axis of the blade unit, joined by a third elastomeric portion disposed generally parallel to the longitudinal axis;

wherein the first, second and third portions of the return element form an integral whole that is generally U-shaped, and an entire length of the third portion abuts a surface of the blade unit.

10. The shaving system of claim 9 wherein the return element is configured to bias the blade unit towards a rest position with respect to a pivot axis that is generally parallel to a long axis of the blade unit.

11. The shaving system of claim 9, wherein the return element comprises a thermoplastic elastomer or thermoplastic urethane.

12. The shaving system of claim 9 wherein the interface element comprises a substantially rigid portion defining a cavity configured to receive a distal end of the handle.

13. The shaving system of claim 12 wherein the return element is molded onto or attached to the substantially rigid portion of the interface element.

14. The shaving system of claim 9 wherein the return element is configured to deflect and then bend or buckle upon rotation of the blade unit toward an upper surface of the handle.

15. The shaving system of claim 9 wherein the interface element comprises pivot elements that are configured to be received by corresponding elements on the blade unit.

16. The shaving system of claim 9 further comprising a pivot stop formed integrally with the blade unit.

17. The shaving system of claim 9 wherein the interface element is configured to be removably mounted on the handle, allowing replacement of the shaving assembly.

18. The shaving system of claim 9 wherein the interface element is fixedly mounted on the handle.

19. The shaving system of claim 18 wherein the interface element is attached to the handle by mechanical engagement or welding.

20. The shaving system of claim 18 wherein the interface element is molded integrally with the handle.

* * * * *